United States Patent Office 3,413,216
Patented Nov. 26, 1968

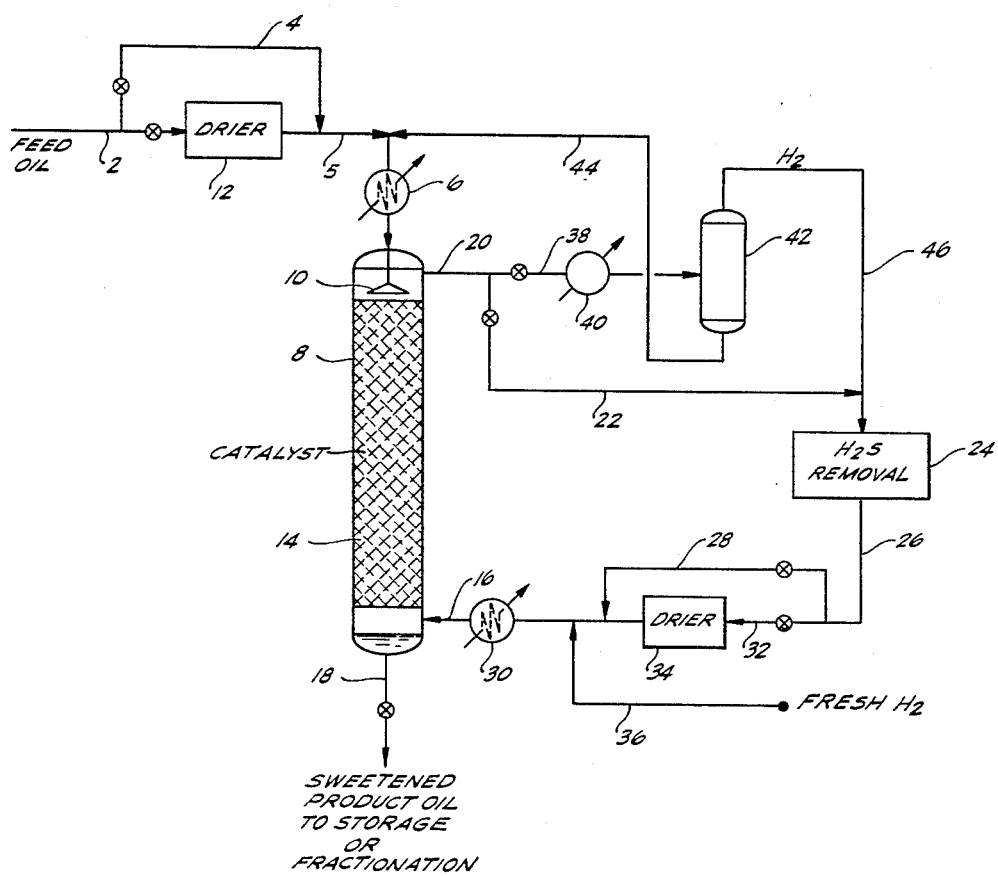

3,413,216
PROCESS FOR SELECTIVELY DESULFURIZING MERCAPTANS
Thomas F. Doumani, Fullerton, Calif., assignor to Union Oil Company of California, Los Angeles, Calif., a corporation of California
Filed Dec. 13, 1965, Ser. No. 513,419
8 Claims. (Cl. 208—216)

ABSTRACT OF THE DISCLOSURE

Mercaptan-contaminated hydrocarbon oils are treated in a countercurrent-flow hydrotreating process wherein the oil is passed downwardly at low temperatures, countercurrently to upflowing hydrogen, both hydrogen and feed being substantially dry in order to maintain adequate catalyst activity at the low temperatures used.

This invention relates to inexpensive new methods for the selective desulfurization of mercaptan-contaminated hydrocarbons such as gasolines, turbine fuels, kerosene, solvents, gas oils and the like. Broadly summarized, the process consists in passing the mercaptan-contaminated feedstock downwardly in liquid phase through a bed of granular, sulfactive hydrogenation catalyst while passing hydrogen upwardly through the bed in countercurrent contact with the feed, and while maintaining certain critical process conditions which favor the selective hydrodecomposition of mercaptans without substantial vaporization of feedstock and with minimal hydrogen consumption. Critical contacting conditions include the use of low temperatures and a hydrogen gas stream which is substantially free of hydrogen sulfide when admitted at the bottom of the catalyst bed. It is also necessary to carry out the contacting under substantially dry conditions.

The principal object of the invention is to provide a simple, economical process whereby a substantially mercaptan-free and hydrogen sulfide-free liquid product can be obtained directly from a single treating unit. A secondary objective is to provide a catalytic hydrodesulfurization process which can be operated under sufficiently mild and selective conditions as to minimize hydrogen consumption and feed vaporization, and give a product having substantially the same boiling range and gravity as the feed. Other objectives will be more apparent from the detailed description which follows.

Many procedures for treating mercaptan-containing fluids are known in the art. In general, these methods may be divided into three main groups: those which physically remove mercaptans; those which convert the mercaptans to other more innocuous compound which remain in the product; and those which chemically decompose the mercaptans. The first group includes mainly selective adsorption and solvent extraction methods. These are expensive in that they require multiple treating vessels, careful control, and facilities for the periodic or continuous regeneration of the adsorbents or solvents employed. The second group includes the well known doctor sweetening process, inhibitor sweetening, and other oxidation procedures which in general convert the mercaptans to disulfides as follows:

(1) 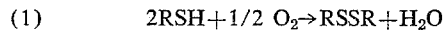 $2RSH + 1/2\ O_2 \rightarrow RSSR + H_2O$

These oxidation methods are in general cumbersome and time consuming and require careful control, and in addition it is often disadvantageous to leave the disulfides in the product; they are deleterious in themselves for some purposes, and in addition may under some circumstances be reconverted to mercaptans, as upon distillation.

In the third category mentioned above, i.e. chemical decomposition, may be mentioned catalytic hydrofining which, as a general desulfurization and denitrogenation procedure, is known also to be effective in decomposing mercaptans as follows:

(2)  $RSH + H_2 \rightarrow RH + H_2S$

However, it has sometimes been difficult in the past to achieve a complete mercaptan removal from the feed by these conventional hydrofining processes, mainly because of a reverse reaction which takes place in the presence of hydrogen sulfide and olefins, as follows:

(3) 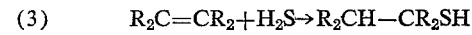 $R_2C = CR_2 + H_2S \rightarrow R_2CH - CR_2SH$

Moreover, in conventional catalytic hydrofining the decomposition of mercaptans is not selective; the usual conditions employed result in a very substantial consumption of hydrogen with hydrogenation of olefins and aromatic hydrocarbons and some hydrocracking, all resulting in a product of wider boiling range and higher gravity than the feed. Moreover, even if complete conversion of mercaptans is obtained, the liquid product obtained is contaminated with hydrogen sulfide which must be removed by a separate posttreatment. Insofar as I am aware, none of the previously proposed hydrofining processes are selective for the removal of mercaptans to the extent of providing a doctor-sweet product of substantially the same gravity as the feed, and which still contains substantial quantities of non-mercpatan sulfur in the product. For many purposes it is not necessary or even desirable to effect complete sulfur removal, but in nearly all cases it is mandatory to achieve a mercaptan-sweet product.

PROCESS CONDITIONS

Fundamentally, the desired selectivity is obtained herein by the use of low temperatures in the contacting zone, ranging between about 300° and 650° F., preferably about 400°–550° F. Optimum temperatures depend primarily upon the boiling range of the feedstock, and particularly its end boiling point. It has been found that the low boiling mercaptans in the $C_1$–$C_5$ range are much more readily decomposed than the higher molecular weight mercaptans found in heavier feedstocks. Consequently, for low-boiling feeds boiling in the 100° to 400° F. range, low temperatures in the 300°–450° F. range are preferred, while for feedstocks boiling up to about 800° F., temperatures in the range of 450°–650° F. are generally preferred. Selectivity for mercaptan decomposition is also dependent, but to a lesser extent, upon the liquid hourly space velocity. At very low space velocities, selectivity tends to be destroyed; consequenty it is preferred to operate at space velocities in the range of about 2 to 30 volumes of liquid feed per volume of catalyst per hour.

It should be noted that the preferred temperatures to be employed for different boiling range feedstocks are fortuitously interrelated with the secondary requirement of the process, namely that of keeping the feedstock in the liquid phase so that countercurrent contacting can be carried out. It is of course necessary in all cases to operate at temperatures below the critical temperature of the feedstock, and further to employ low hydrogen/oil ratios to minimize feed vaporization. It has been found that the objectives of this invention can be achieved using hydrogen rates in the range of about 200 to 3,000 s.c.f. per barrel of feed. Using these low hydrogen rates, and observing the preferred temperatures correlated with the boiling range of the feed, it is found that a practical countercurrent-flow operation can be maintained with no more than about 1–2 percent of the feed being vaporized. This result is obtained at normal operating pressures ranging between about 200 and 3,000 p.s.i.g., preferably between about 400 and 1,500 p.s.i.g.

The countercurrent operation required herein has at least a twofold function. Firstly, the hydrogen sulfide-free hydrogen stream acts as a stripping gas to sweep hydrogen sulfide formed in the contacting zone upwardly and out of the reactor, thus providing a liquid product free of hydrogen sulfide. Secondly, by providing a hydrogen sulfide-free environment in the lower portion of the reactor, reaction (3) above is prevented, and the reverse reaction is permitted to go to completion, thus insuring a doctor-sweet product. It has been found that a doctor-sweet product is very difficult to attain in normal concurrent flow of hydrogen and feed, except in those cases where a completely olefin-free feedstock is utilized. The mild conditions employed herein may bring about a substantial hydrogenation of diolefins, but the hydrogenation of monoolefins is very incomplete. Hence, in order to drive reaction (3) to completion in the reverse direction it is necessary to insure a hydrogen sulfide-free environment in the lower portion of the reactor.

In conventional catalytic hydrofining carried out at the usual high temperatures of e.g. 700°–850° F., substantial catalytic activity can be maintained even though fairly large amounts of water vapor are present. This is due to two factors: firstly, at high temperatures a much larger number of active centers on the catalyst are operative thus requiring larger quantities of water vapor to poison a significant portion of such centers. Secondly, such high temperatures favor desorption of water from the catalyst so that a higher partial pressure thereof may be tolerated. But at the low temperatures required herein, the water concentration in the contacting zone becomes more critical, both because of increased adsorption and the relatively lower number of operative active centers on the catalyst. As a result of this water sensitivity at low temperatures, it is generally necessary to maintain the water content of the feedstock at values below about 100 p.p.m., and preferably below 50 p.p.m., by weight, and to utilize a hydrogen gas stream (including any recycle) having a dewpoint below about 50° F., and preferably below 0° F. at atmospheric pressure. In any given operation, it will be understood that the maximum tolerable water input to the reactor will vary with the temperature maintained therein, substantially higher water levels being tolerable at higher temperatures than at the lower temperatures.

CATALYSTS

Operable catalysts for use herein may be of the conventional hydrofining type. This includes primarily the metals of Groups VI–B and VIII of the Periodic Table, e.g. molybdenum, tungsten, chromium, iron, cobalt, nickel, or the like, as well as the sulfides or other compounds of such metals. In general, it is preferred to avoid reducible metal oxides, or other compounds which when reduced give rise to water in the reaction zone. An especially preferred group of catalysts comprises a combination of one or more of the Group VI–B metals, e.g. tungsten or molybdenum, combined with one or more of the metals of the iron group, especially cobalt or nickel, either in the free metallic state or in a sulfided form. Preferably, such metals or metal sulfides are supported, as by impregnation, upon a difficultly reducible carrier having an extended surface area, such as activated alumina, silica gel, titania, zirconia, acid activated clays and the like, or any desired combination of such materials. The amount of hydrogenating metal on the carrier may vary between about 1% and 30% by weight.

An especially preferred group of catalysts consists of about 10–20% by weight of molybdenum or tungsten, and between about 2% and 10% by weight of cobalt or nickel supported upon an activated alumina carrier, preferably an activated alumina containing about 2–15% by weight of coprecipitated silica gel.

In preparing impregnated catalysts of the nature described above, the normal procedure is to impregnate the carrier with aqueous solutions of salts of the desired metal or metals, followed by drying and calcining of the impregnated carrier. This normally converts the impregnated salts to oxides, and prior to use herein it is preferred to convert such oxides either to free metals or to sulfides, while at the same time removing any water formed during the conversion. To reduce the catalyst to a free metal state and to remove the water formed, the oxide form is contacted with a stream of hydrogen at temperatures between about 500° and 1,000° F. This reduced form may be used as such, or it may be converted to a sulfide form by treatment at any desired temperature with hydrogen sulfide. The sulfided forms may also be prepared by treating the oxide forms directly with hydrogen sulfide at temperatures between about 500° and 1,000° F. It is a noteworthy fact that both the reduced catalysts and the sulfided forms appear to be substantially equivalent in activity for the present hydrosweetening process, whereas in conventional hydrofining the sulfided forms are much more active than the reduced forms.

DESCRIPTION OF DRAWING

Reference is now made to the attached drawing which is a flow diagram illustrating process details of the invention.

The initial sour feedstock is brought in via line 2 and may, if sufficiently dry, be passed directly via bypass line 4 and line 5 through feed preheater 6, and thence into contacting vessel 8 via a suitable sparger or other feed distribution device 10 to achieve uniform distribution of the liquid feed over the top of the catalyst bed. If however, the initial feedstock contains water in undesirable amounts it is first passed through a drying unit 12 to reduce the water content to the desired level. Drier 12 may comprise any conventional unit for drying liquid hydrocarbons, as e.g. a bed of suitable adsorbent such as silica gel, molecular sieves, calcium chloride or the like.

The liquid feed introduced via feed distributor 10 trickles downwardly in catalyst bed 14 countercurrently to a stream of rising hydrogen gas introduced near the bottom of the reactor via line 16. Sweetened liquid product accumulates in the bottom of reactor 8 and is withdrawn via line 18 and sent to product storage or fractionation equipment not shown.

Vapor phase effluent from reactor 8 is withdrawn near the top thereof via line 20, and comprises mainly hydrogen gas with minor proportions of hydrogen sulfide and light hydrocarbons. Since the hydrogen/oil ratios utilized herein are normally very low, it is in many cases feasible to divert this entire off-gas stream for utilization as make-up hydrogen in other units of the refinery such as conventional hydrofiners, hydrocrackers or the like, and thus operate the entire unit on a once-through hydrogen basis. However, in the modification illustrated provision is made via two alternative methods for recycle of the hydrogen off-gas.

According to one alternative, a hot recycle is maintained by diverting the off-gases via line 22 directly to a hydrogen sulfide removal unit 24 which functions at high temperatures. Such a unit may comprise for example a dry bed of adsorbent material such as sodium hydroxide, lime, molecular sieve type adsorbents, or other adsorbents capable of removing hydrogen sulfide. Preferably an adsorbent is utilized which does not generate water by chemical combination of hydrogen sulfide therewith.

The hydrogen sulfide-free effluent from unit 24 is then withdrawn via line 26, and if the water content thereof is sufficiently low, may be passed directly back into reactor 8 via bypass line 28, preheater 30 and line 16. Alternatively, if it is necessary to reduce the dewpoint of the recycle gas, it is passed via line 32, through drier 34 and thence into reactor 8 via preheater 30. Fresh make-up hydrogen is admitted via line 36.

The foregoing mode of operation is feasible only where hydrogen sulfide removal unit 24 is capable of operating at the temperatures of the off-gases. Most hydrogen sulfide removal units however are of the wet type utilizing caustic solvents or organic amine solvents of the Girbitol type. These units require that the recycle gas be cooled to below the boiling point of the solvent. Therefore, when utilizing scrubbing units of this nature, the off-gases in line 20 are passed via line 38 through condenser 40, into knock-out pot 42, in which a small amount of condensate may settle out. This condensate normally amounts to no more than about 1% of the feed, and may hence be recycled if desired via line 44 back to feed inlet line 5, and thence back into the reactor where it is stripped of dissolved hydrogen sulfide. The cooled recycle gas from knock-out pot 42 is withdrawn via line 46 and returned to the reactor as previously described via hydrogen sulfide removal unit 24, drier 34 and preheater 30.

The following examples are cited to illustrate the invention, but are not to be construed as limiting in scope:

EXAMPLES

The basic catalyst employed in all of the succeeding examples was a composite of nickel and molybdenum supported upon an activated alumina carrier, the content of nickel being 3.05 weight-percent as NiO, and the molybdenum content being 15.0 weight-percent as $MoO_3$.

Example 1

This example demonstrates that when the oxide form of the catalyst is employed initially, the water generated upon contact with hydrogen in the process brings about rapid deactivation.

A feedstock consisting of a light hydrocracked gasoline boiling between about 100° and 220° F., containing 72 mg./l. of mercaptan sulfur and 98 p.p.m. of total sulfur was passed downwardly over the oxidized catalyst at 8 LHSV, 300° F. and 600 p.s.i.g., countercurrently to a stream of hydrogen admitted at the rate of 1,000 s.c.f. per barrel of feed. The liquid product recovered during the first 30 minutes of contacting was free of mercaptans and hydrogen sulfide, but thereafter became very sour, containing in excess of 10 mg./l. of mercaptan sulfur. The catalyst was then heated and stripped in a stream of hydrogen at 800° F., and it was noted that a considerable quantity of water was recovered in the effluent condensate trap. The dried catalyst was then utilized again for hydrosweetening the same feedstock under the same conditions, and in the dry reduced state was found to give a doctor-sweet product (less than 2 mg./l. of mercaptan sulfur).

Another portion of the catalyst in its initially oxidized form was presulfided at room temperature with $H_2S$, no attempt being made to dry the catalyst before use. This catalyst under the same conditions, using the same feedstock, was found to give a sour product containing in excess of 10 mg./l. of mercaptan sulfur. After heating and stripping this catalyst in hydrogen at 800° F., a continuously doctor-sweet product was obtained at 300° F., although when the temperature was reduced to 250° F., the product became sour. It was then found necessary to raise the temperature to 350° F. in order to maintain a doctor-sweet product.

Example 2

After the presulfided and prereduced catalyst of Example 1 had been employed for several days for the sweetening of light gasoline and other feedstocks, its activity had declined to the point that a sour product containing 6 mg./l. of mercaptan sulfur was obtained. This deactivation was believed due to water adsorption from some of the wet feedstocks previously employed. To test this theory, and to rule out the possibility that the reactivation noted in Example 1 after hydrogen calcining was due to some beneficial chemical effect of hydrogen upon the catalyst, the partially deactivated catalyst was heated and purged at 800° F. in a stream of argon gas for 2 hours. A substantial quantity of water was recovered in the condensate receiver. Upon employing the argon-purged catalyst for sweetening the light gasoline of Example 1 under the same conditions, a sweet product was again obtained containing less than 1 mg./l. of mercaptan sulfur.

Example 3

Following the runs reported in Example 2, the same catalyst, without regeneration, was employed for sweetening an aliphatic petroleum solvent fraction boiling between about 270° and 450° F., having an API gravity of 49, a total sulfur content of about 175 p.p.m. and a mercaptan sulfur content of about 15–17 mg./l. Utilizing the same countercurrent hyrogen-oil contacting technique, a continuously sweet product containing less than 1 mg./l. of mercaptan sulfur was obtained over a several hour run carried out at 400° F., 300 p.s.i.g., 8 LHSV, and using 500 s.c.f. per barrel of hydrogen. There was no measurable vaporization of the feed during this run, and there was very little chemical hydrogen consumption as is evident from the fact that the product gravity was essentially the same as that of the feed i.e. about 49, and at least about half of the total sulfur content of the feed remained in the product. It is evident therefore that the process is selective for sweetening as opposed to total desulfurization, and that hydrogen consumption is minimal.

Example 4

To compare the effect of countercurrent flow versus concurrent downflow of hydrogen-oil, two parallel sweetening runs were carried out using the sulfided and reduced nickel-molybdenum catalyst employed in Example 1. Conditions constant in both runs were: LHSV 4.0, temperature 455° F., pressure 300 p.s.i.g., and hydrogen/oil ratio 1,000 s.c.f. per barrel of feed. The feed in both cases was a straight run petroleum solvent fraction having a boiling range of about 500°–600° F., an API gravity of 36.9°, and containing 0.135 weight-percent total sulfur and 17 mg./l. of mercaptan sulfur.

In run A (concurrent downflow), a doctor-sour product was obtained containing 22 mg./l. of sulfur as hydrogen sulfide and 3 mg./l. as mercaptan sulfur, and having an average gravity of 37.1° API. Total sulfur content of the product was 0.11 weight percent.

In run B (countercurrent flow), a doctor-sweet product was obtained containing less than 1 mg./l. of sulfur as hydrogen sulfide and 2 mg./l. of mercaptan sulfur, and having an API gravity of 36.9°. The total sulfur content was 0.10 weight percent.

This example shows that the countercurrent flow technique is more selective for sweetening as opposed to total desulfurization, giving a mercaptan-sweet and hydrogen sulfide-sweet product having the same gravity as the feed. The concurrent downflow technique on the other hand gave a product sour both with respect to mercaptans and hydrogen sulfide, and brought about a slight increase in gravity of the feed, indicating increased hydrogen consumption.

Results substantially similar to those described in the foregoing examples are obtained when other catalysts, other conditions and other feedstocks within the purview of the preceding general disclosure are utilized, and it is hence not intended that the invention be limited to the details of the examples. The true scope of the invention is intended to be embraced by the following claims.

I claim:

1. A process for selectively hydrodesulfurizinfi mercaptans from a hydrocarbon feedstock containing sulfur contaminants, which comprises passing said feedstock downwardly in liquid phase through a bed of granular hydrogenation catalyst consisting essentially of at least one Group—VI–B and/or iron group metal in a reduced or sulfided state at a temperature between about 300° and 550° F., and at a space velocity above about 2.0 while passing a stream of initially substantially hydrogen sulfide-free, dry hydrogen treat gas upwardly through said catalyst bed, controlling the pressure and hydrogen/oil ratio so as to prevent any substantial vaporization of said feedstock, maintaining substantially anhydrous contacting conditions to provide a mercaptan desulfurized liquid effluent at the specified temperatures and space velocities, and withdrawing from the bottom of said catalyst bed a liquid hydrocarbon product substantially free of mercaptans.

2. A process as defined in claim 1 wherein said feedstock contains a substantial proportion of non-mercaptan sulfur, and wherein the contacting conditions of temperature and pressure are controlled so as to provide a doctor-sweet product still containing substantial amounts of non-mercaptan sulfur, thereby minimizing hydrogen consumption.

3. A process as defined in claim 1 wherein said catalyst is a Group VI–B metal or sulfide thereof combined with an iron group metal or sulfide thereof supported on a major proportion of a relatively inert adsorbent carrier.

4. A process as defined in claim 1 wherein said catalyst is nickel or nickel sulfide plus molybdenum or molybdenum sulfide supported upon a carrier which is essentially activated alumina.

5. A process as defined in claim 1 wherein the water content of said feedstock is below about 100 p.p.m. by weight, and wherein said hydrogen gas stream has a dew-point below about 50° F. at atmospheric pressure.

6. A process as defined in claim 1 wherein a hydrogen sulfide containing off-gas is withdrawn from the top of said catalyst bed, treated to remove hydrogen sulfide, and then recycled to form at least a portion of said hydrogen sulfide-free treat gas.

7. A process as defined in claim 1 wherein said feedstock, prior to contacting said catalyst bed, is subjected to a dehydration step to reduce the water content thereof to below about 100 p.p.m.

8. A process as defined in claim 1 wherein said contacting is carried out at a pressure between about 200 and 3,000 p.s.i.g.

References Cited
UNITED STATES PATENTS

| | | | |
|---|---|---|---|
| 2,671,754 | 3/1954 | DeRosset et al. | 208—89 |
| 2,757,127 | 6/1956 | Porter et al. | 208—212 |
| 3,147,210 | 9/1964 | Hass et al. | 208—216 |

DELBERT E. GANTZ, *Primary Examiner.*

G. J. CRASANAKIS, *Assistant Examiner.*